United States Patent
Sohraby et al.

(10) Patent No.: US 6,542,462 B1
(45) Date of Patent: Apr. 1, 2003

(54) METHOD AND APPARATUS FOR OVERLOAD CONTROL OF MULTIMEDIA COMMUNICATIONS IN A HYBRID SWITCHING SYSTEM

(75) Inventors: Kazem Anaraky Sohraby, Lincroft, NJ (US); On-Ching Yue, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/085,309

(22) Filed: May 27, 1998

(51) Int. Cl.[7] ............................................... G01R 31/08
(52) U.S. Cl. ....................... 370/229; 370/230
(58) Field of Search .......................... 379/220; 370/352, 370/389, 392, 229, 230, 231, 232, 234, 235, 238, 259, 260, 261, 263, 265, 468, 395.1, 466, 402, 252; 455/564

(56) References Cited

U.S. PATENT DOCUMENTS

| | | | |
|---|---|---|---|
| 5,164,938 A | * 11/1992 | Jurkevich et al. | 370/231 |
| 5,367,522 A | * 11/1994 | Otani | 370/468 |
| 5,504,744 A | * 4/1996 | Adams | 370/232 |
| 5,513,257 A | * 4/1996 | Yoo et al. | 379/220 |
| 5,564,001 A | * 10/1996 | Lewis | 707/500.1 |
| 5,673,253 A | * 9/1997 | Shaffer | 370/229 |
| 5,867,494 A | * 2/1999 | Krishnaswamy et al. | 370/352 |
| 5,867,495 A | * 2/1999 | Elliot et al. | 370/352 |
| 5,940,369 A | * 8/1999 | Bhagavath et al. | 370/229 |
| 6,046,988 A | * 4/2000 | Schenkel et al. | 370/254 |
| 6,084,879 A | * 7/2000 | Berl et al. | 370/389 |
| 6,167,030 A | * 12/2000 | Kilkki et al. | 370/236 |
| 6,192,049 B1 | * 2/2001 | Sohraby | 370/389 |
| 6,253,207 B1 | * 6/2001 | Malek et al. | 707/104.1 |

* cited by examiner

Primary Examiner—Douglas Olms
Assistant Examiner—Phirin Sam
(74) Attorney, Agent, or Firm—Ryan, Mason & Lewis, LLP (57) ABSTRACT

A system is disclosed for overload control in a hybrid switching system that separately transports each monomedia stream, such as video, voice and data, of a composite multimedia signal. The overload control is based on the time delay for completion of call establishment of each multimedia session. When the average time delay for completion of call establishment of each multimedia session is below a predefined threshold, the system has sufficient capacity and overload corrective measures are not required. When the average time delay for completion of call establishment of each multimedia session, or a connection for any individual monomedia component within the multimedia session, exceeds a predefined threshold, the switching system is approaching an overload condition, and overload control must be implemented to reduce the number of calls accepted in the next time interval. A decision is made at the beginning of each time interval based on the average call completion time delay over some predefined period of time, to accept a determined number of calls during each time interval.

18 Claims, 4 Drawing Sheets

400 → OVERLOAD CONTROL ANALYSIS DATABASE

| | CASE NUMBER | CONDITIONS | NUMBER OF CALLS OF EACH TYPE TO BE ADMITTED FOR INTERVAL |
|---|---|---|---|
| 405 | 1 | $T_1^* < T_1^{MAX}$<br>$T_2^* < T_2^{MAX}$<br>$T_0^* < T_0^{MAX}$ | $K_1^n = N_1^{n-1} \times (T_1^{MAX} / T_1^*)$<br><br>$K_2^n = N_2^{n-1} \times (T_2^{MAX} / T_2^*)$ |
| 410 | 2 | $T_1^* > T_1^{MAX}$<br>$T_2^* < T_2^{MAX}$<br>$T_0^* < T_0^{MAX}$ | $K_1^n = \max\{N_1^{n-1} \times (T_1^{MAX} / T_1^*), N_1^{MIN}\}$<br><br>$K_2^n = N_2^{n-1} \times (T_2^{MAX} / T_2^*)$ |
| 415 | 3 | $T_1^* < T_1^{MAX}$<br>$T_2^* > T_2^{MAX}$<br>$T_0^* < T_0^{MAX}$ | $K_1^n = N_1^{n-1} \times (T_1^{MAX} / T_1^*)$<br><br>$K_2^n = \max\{N_2^{n-1} \times (T_2^{MAX} / T_2^*), N_2^{MIN}\}$ |
| 420 | 4 | $T_1^* > T_1^{MAX}$<br>$T_2^* < T_2^{MAX}$<br>$T_0^* > T_0^{MAX}$ | $K_1^n = \max\{N_1^{n-1} \times (T_1^{MAX} / T_1^*), N_1^{MIN}\}$<br><br>$K_2^n = N_2^{n-1} \times (T_2^{MAX} / T_2^*)$ |
| 425 | 5 | $T_1^* < T_1^{MAX}$<br>$T_2^* > T_2^{MAX}$<br>$T_0^* > T_0^{MAX}$ | $K_1^n = N_1^{n-1} \times (T_1^{MAX} / T_1^*)$<br><br>$K_2^n = \max\{N_2^{n-1} \times (T_2^{MAX} / T_2^*), N_2^{MIN}\}$ |
| 430 | 6 | $T_1^* > T_1^{MAX}$<br>$T_2^* > T_2^{MAX}$<br>$T_0^* < T_0^{MAX}$ | $K_1^n = \max\{N_1^{n-1} \times (T_1^{MAX} / T_1^*), N_1^{MIN}\}$<br><br>$K_2^n = \max\{N_2^{n-1} \times (T_2^{MAX} / T_2^*), N_2^{MIN}\}$ |
| 440 | 7 | $T_1^* > T_1^{MAX}$<br>$T_2^* > T_2^{MAX}$<br>$T_0^* > T_0^{MAX}$ | $K_1^n = \max\{N_1^{MIN}, \min[N_1^{n-1} \times (T_1^{MAX} / T_1^*), N_1^{n-1} \times (T_0^{MAX} / T_0^*)]\}$<br><br>$K_2^n = \max\{N_2^{MIN}, \min[N_2^{n-1} \times (T_2^{MAX} / T_2^*), N_2^{n-1} \times (T_0^{MAX} / T_0^*)]\}$ |
| 445 | 8 | $T_1^* > T_1^{MAX}$<br>$T_2^* > T_2^{MAX}$<br>$T_0^* < T_0^{MAX}$ | $K_1^n = \max\{N_1^{MIN}, N_1^{n-1} \times (T_0^{MAX} / T_0^*)\}$<br><br>$K_2^n = \max\{N_2^{MIN}, N_2^{n-1} \times (T_0^{MAX} / T_0^*)\}$ |

METHOD AND APPARATUS FOR OVERLOAD CONTROL OF MULTIMEDIA COMMUNICATIONS IN A HYBRID SWITCHING SYSTEM

FIELD OF THE INVENTION

The present invention relates to a network communication system, and more particularly, to a method and apparatus for overload control of a composite multimedia signal transmitted across one or more heterogeneous networks consisting of a hybrid switch device, including an ATM network, as separately switched monomedia streams.

BACKGROUND OF THE INVENTION

The use of broadband networks, such as asynchronous transfer mode (ATM) networks, for the transfer of multimedia information, such as video, voice and data, has become increasingly popular due to the high data rate and flexibility associated with such networks. ATM networks, for example, utilize a cell-oriented switching and multiplexing technique, and are based upon the use of fixed-length "cells". ATM and other broadband networks have been embraced by the computer and telecommunication industries for networking existing and future multimedia applications, such as video conferencing, video-on-demand, and telephone applications.

Currently, multimedia information may be transmitted across ATM and other networks to an end user by means of an integrated transport protocol, whereby the various monomedia components within the composite multimedia signal are encoded and transported together. This integrated transport approach, however, imposes several limitations, which, if overcome, could greatly expand the flexibility and quality of multimedia communications, particularly across heterogeneous networks. For example, it is not expected that all end-user devices and network service subscribers on heterogeneous networks would desire, or be capable of accessing, all monomedia components in a multimedia presentation. For example, in a conference call, some end users may desire to access only voice and data, or just voice, and not video.

In addition, in the end-to-end path of multimedia sessions, heterogeneous network technologies, such as switches with different switch fabrics or diverse transport links, hereinafter referred to as "network segments," may be involved. For subscribers and locations where switch fabrics supporting a multimedia session are not available, only a subset of monomedia elements of a multimedia session may be supported. For example, if one or more network segments are wireless, the radio access (or the wireline portion of the wireless network) may only support voice, and not support data or video.

U.S. patent application Ser. No. 08/936,386, filed Sep. 25, 1997 and entitled "Method and Apparatus for Transporting Multimedia Information Over Heterogeneous Wide Area Networks," discloses a method and apparatus for separately transporting each monomedia stream, such as video, voice and data, of a composite multimedia signal across heterogeneous networks, including an ATM network. Thus, monomedia traffic from a multimedia session is transported over different network segments to different end users, which may or may not support or desire all multimedia components.

When a call is established in a monomedia or multimedia system, the call processor must perform call admission to ensure that sufficient switching resources are available in the system to handle the call. If the call processor is in an "overload" condition, where the volume of signaling traffic exceeds the capacity of the call processor, the call processor should exercise overload control. If overload is not properly controlled, system throughput can be reduced, and even cause the network to cease operation. Although overload control problems can occur in both monomedia and multimedia networks, the issue is more critical for the multimedia system disclosed in U.S. patent application Ser. No. 08/936, 386 U.S. Pat. No. 6,253,207, because each multimedia session requires a separate connection for each monomedia component. It is possible, however, that sufficient resources are available in the multimedia system for only a portion of the multimedia session. Under these circumstances, and depending on the requirements of the end user, the multimedia session may be rejected altogether, or the network may negotiate with the end user to establish one of the monomedia connections composing the multimedia session for which resources are available.

Several methods of overload control to maximize system throughput have been proposed or suggested for monomedia systems in order to maximize system throughput. These methods are primarily based on throttling signaling traffic before the signaling traffic enters the call processor. Throttling traffic can be performed in a number of ways, including (i) accepting or rejecting an arriving call or message with a predefined probability; and (ii) devising a "gap," whereby the number of calls exceeding a threshold in a predefined time interval are rejected. These methods of overload control attempt to maximize the amount of time for which the call processor can perform "useful work." Useful work is defined as the rate of calls or messages that complete their functions within a predefined timer interval or with other desirable characteristics of the switching system.

As apparent from the above-described deficiencies with conventional systems for transporting multimedia information, a need exists for an improved method and apparatus for overload control in a hybrid switching system supporting multimedia communications that separately transports each monomedia stream of a composite multimedia signal across a network. A further need exists for a multimedia communication system that throttles individual monomedia components of a multimedia session in desired amounts. Yet another need exists for a multimedia communication system that determines whether to accept or reject a multimedia call when there is insufficient capacity for each monomedia component in the multimedia session.

SUMMARY OF THE INVENTION

Generally, according to one aspect of the present invention, a system for overload control is disclosed for hybrid switching systems consisting of multiple switch fabrics and one or more call processors that separately transport each monomedia stream, such as video, voice and data, of a composite multimedia signal. The overload control is based on the time delay for completion of call establishment of each multimedia session in the switching system. A rate-based method is utilized for determining the number of call requests that can be admitted into a network node in a given time interval.

When the average time delay for completion of call establishment of each multimedia session is below a predefined threshold, the hybrid switching system has sufficient capacity and an overload condition is not present and corrective measures are not required. According to an aspect of the invention, when the average time delay for completion of call establishment of each multimedia session, or a connection for any individual monomedia component within the multimedia session, exceeds a predefined threshold, the switching system is approaching an overload condition, and overload control techniques must be implemented to reduce the number of calls accepted in future time intervals. A decision is made at the beginning of each time interval based on the average call establishment time delay over some predefined period of time, to accept a determined number of calls during the time interval. Thus, the present invention adapts to the processing speed of the call processor and the available capacity of the switching system.

The number of calls, $K_i^n$, of each monomedia type, i, that can be admitted into a network node are determined for each time interval, T. The size of the interval, T, can vary, depending on the system requirements. In one preferred implementation, the number of calls, $K_i^n$, of each monomedia type, i, admitted into a network node for the n-th time interval, T, is based on the number of calls already admitted over the previous interval, $N_i^{n-1}$.

A more complete understanding of the present invention, as well as further features and advantages of the present invention, will be obtained by reference to the following detailed description and drawings.

BRIEF DESCRIPTION OF THE DRAWINGS

FIG. 4 is a sample table from the overload control analysis database of FIG. 2.

DETAILED DESCRIPTION

Figure 1:
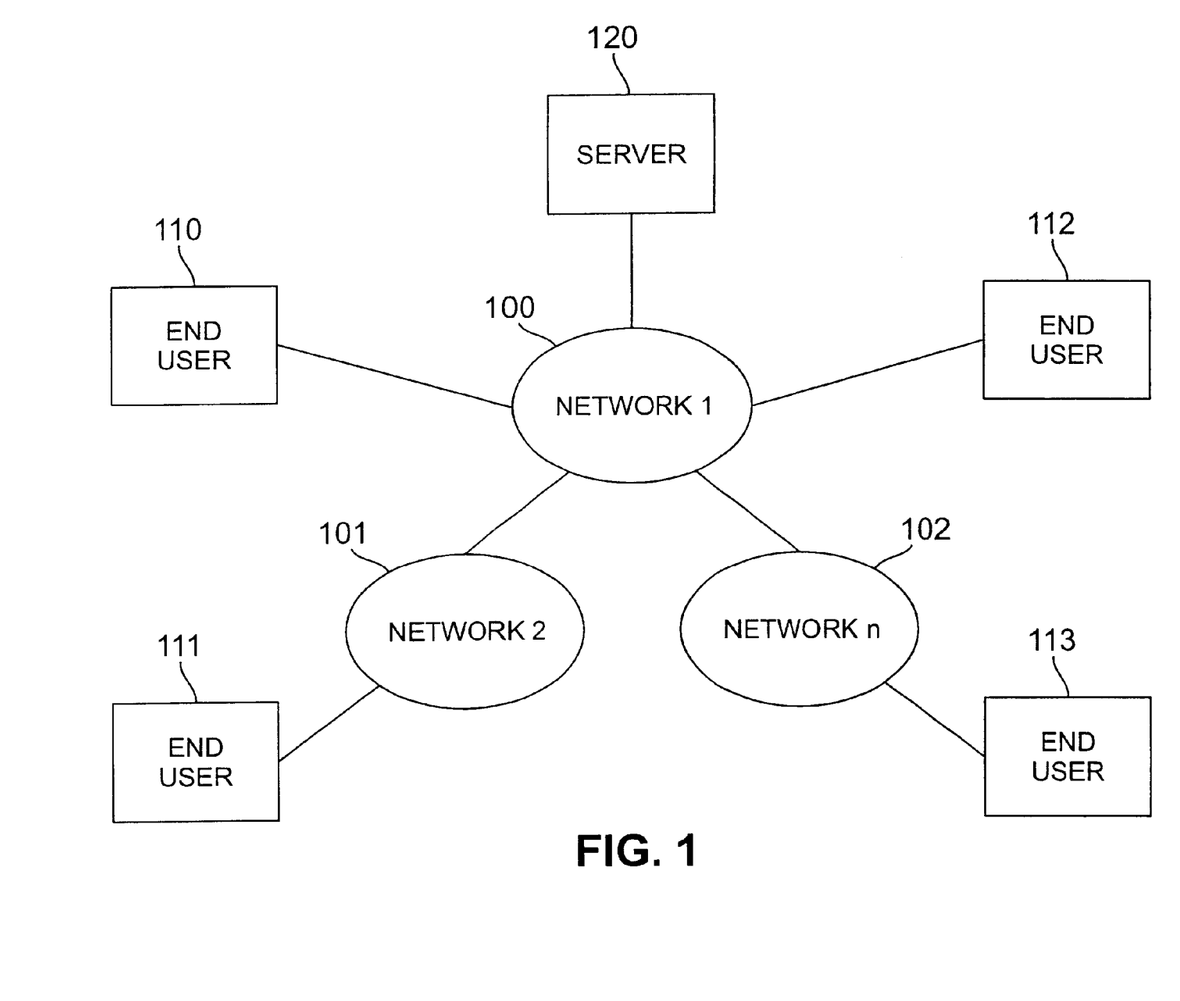
FIG. 1 illustrates a block diagram of a broadband network consisting of multiple heterogeneous networks suitable for transferring information from a source device to one or more destination devices.

FIG. 1 shows an illustrative network environment 100–102 for transferring multimedia information, such as video, voice and data, between one or more sources and destinations, such as end users 110–113 and server 120. Each end user 110–113, such as end user 110, may not desire, or be capable of accessing, all monomedia components of a given composite multimedia session. The network environment 100–102 can include a hybrid switching system or an asynchronous transfer mode (ATM) network, as well as other suitable networks or heterogeneous combinations thereof, such as circuit and packet switch networks, as well as other broadband networks, as would be apparent to a person of ordinary skill. In the illustrative embodiment, the end users 110–113 can utilize work stations (not shown), as well as other general-purpose devices, such as a telephone system or a videophone system. The server 120 may be embodied, for example, as a file server, a music server, or a video-on-demand server system.

Each component monomedia stream of a composite multimedia signal is separately transported across the network 100. In this manner, monomedia traffic can be transported over different network segments, which may or may not support all multimedia components. The networks 100–102, such as an illustrative ATM network 100, are comprised of a plurality of network nodes, discussed below in conjunction with FIG. 2, interconnected by a plurality of data links. Thus, at an illustrative network node 200, which may be a switch or a multiplexer, where access to the network 100 takes place, each monomedia component, n, such as video, voice and data, of the multimedia session is separately transmitted to a different connection having a capacity, $C_n$. The capacity, $C_n$, is generally specified in number of units of information transferred per unit time.

Figure 2:
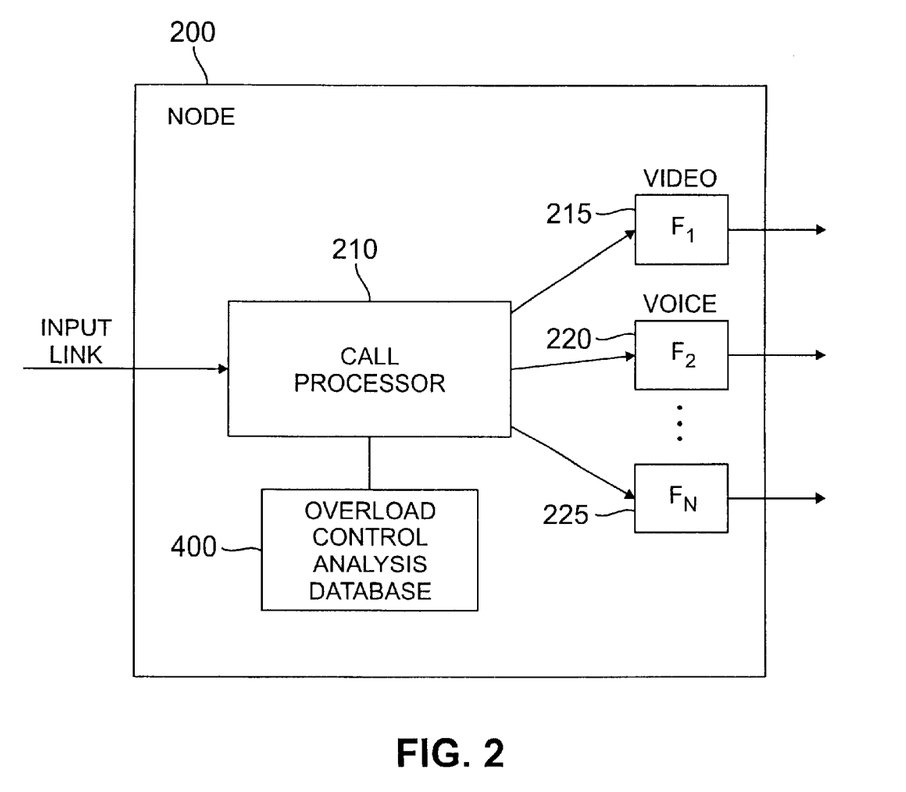
FIG. 2 is a schematic block diagram of an exemplary node in the hybrid switching system of FIG. 1.

According to a feature of the present invention, overload control for multimedia communications is based on observing the time delay for completion of call establishment of each multimedia session in a hybrid switching system that carries multimedia sessions with a set of switching fabrics each supporting corresponding connections. As discussed further below, a rate-based method is utilized for determining the number of call requests that can be admitted into a network node 200. Generally, when the average time delay for completion of call establishment of each multimedia session is below a predefined threshold, the hybrid switching system has sufficient capacity, an overload condition is not present and corrective measures are not required. According to a feature of the present invention, when the average time delay for completion of call establishment of each multimedia session, or a connection for any individual monomedia component of the multimedia session, exceeds a predefined threshold, the hybrid switching system is approaching an overload condition, and overload control techniques must be implemented to reduce the number of calls accepted in the next time interval. Thus, a decision is made at the beginning of each time interval based on the average call completion time delay over some predefined period of time to accept a determined number of calls during the time interval. In this manner, the present invention adapts to the processing speed of the call processor and the available capacity of the heterogeneous networks 100–102.

In one embodiment, the call completion time delay is defined as the time interval between the initial request for connection as a call enters the call processor, such as an Initial Address Message (IAM) for the SS7 signaling protocol, and the call connection completion message, such as an Address Complete Message (ACM) for the SS7 signaling protocol. The call completion time delay is utilized to determine the number of call requests for both monomedia and multimedia connections that can be admitted into a network node 200. The call completion time delay of a given illustrative multimedia session consisting of two monomedia connections is $T_0 = \max\{T_1 \text{ and } T_2\}$, where $T_1$ and $T_2$ are the call completion time delays of each of the respective monomedia connections. In other words, a multimedia session is not considered to be established until all of the monomedia components included in the multimedia session are established.

As discussed further below in conjunction with FIG. 3, the number of calls, $K_i^n$, of each monomedia type, i, that can be admitted into a network node 200 are determined for the n-th time interval, T. The size of the interval, T, can vary, depending on the system requirements, as would be apparent to a person of ordinary skill in the art. In one preferred implementation, the number of calls, $K_i^n$, of each monomedia type, i, admitted into a network node 200 for the n-th time interval, T, is based on the number of calls already admitted over the previous interval, $N_i^{n-1}$.

In an illustrative embodiment, a multimedia session consists of two monomedia components. Thus, each multimedia call that is admitted is equivalent to admitting two monomedia calls, having one of each monomedia type. $T_0^{max}$ represents the interval within which both connections of a multimedia session must be established for the multimedia connection to be considered successful. If one or both of the monomedia connections in the multimedia session are established after $T_0^{max}$, then the multimedia connection request is assumed expired and the multimedia connection is void. Normally, when a system is empty or lightly loaded, both connection completion messages arrive within a time interval, $T_0^{min}$. In heterogeneous networks 100–102, monomedia call connection requests independent of multimedia sessions may also exist. Thus, call processor overload can occur as the result of monomedia or multimedia traffic. $T_i^{max}$ represents the interval within which the respective monomedia connections, i, should be established. $T_0^{max}$ represents the interval for a multimedia connection within which each of the individual monomedia connections, i, within a multimedia session should be established.

The average call completion time delay, $T_i^*$, for a monomedia component of type, i, may be determined from average measured values of $T_i^n$ over the n-th interval. In the illustrative embodiment, the average call completion time delay, $T_i^*$, is filtered from averages of the past time intervals. In accordance with the present invention, the actual average call completion time delay, $T_i^*$, for each monomedia type, i, should be less than the corresponding predefined average call completion time delay threshold, $T_i^{max}$, for the monomedia type, i. In addition, for multimedia calls, the actual average call completion time delay, $T_0^*$, for the multimedia session should be less than the corresponding predefined session average call completion time delay threshold, $T_0^{max}$, for the multimedia session, where $T_0^{max}$ is the maximum average call completion time delay, $T_i^*$, for each monomedia type, i. In this manner, each of the monomedia connections comprising the multimedia session are established within an acceptable connection interval $T_0^{max}$.

In an illustrative ATM network environment 100, individual connections can be established for each monomedia component by assigning separate VP/VC identifiers to each monomedia connection. It is noted that the different monomedia components may not travel the same physical path across the network 100. In fact, subsequent different switch fabrics may be utilized for each monomedia stream. For example, a circuit switch fabric may be utilized for the voice portion of a multimedia call while a packet switch fabric may be utilized for the image or data portions of the same multimedia call.

A hybrid switching system, such as the switching system 200, shown in FIG. 2, consists of multiple switching fabrics 215, 220, 225, one for each particular type of monomedia traffic, and one or more call processors 210. When a request for a monomedia or multimedia session arrives at the call processor 210, the request is processed by the call processor 210 and the component monomedia connection requests are forwarded to the corresponding switching fabrics 215, 220, 225 for connection establishment. A multimedia connection request consists of multiple monomedia connection requests. A multimedia session is assumed established if all component monomedia sessions are established. When one or more call processors or the switching fabric (or its corresponding call processor) is in an overload condition, then the connection established for component monomedia sessions, and thus for the multimedia session, is delayed. The present invention proposes ways to avoid overload situations that may result in the hybrid switch performance degradation.

According to a feature of the present invention, each node 200 preferably includes a call processor 210, discussed further below in conjunction with FIG. 5. The call processor 210 will ensure that sufficient resources exist on the heterogeneous networks 100–102 for each monomedia component in the multimedia session, separate each monomedia stream from a composite multimedia signal and transmit it to a different switch fabric 215–225, each associated with a particular monomedia connection. It is noted that the node 200 may include a monomedia call processor (not shown) to ensure that sufficient resources exist on the heterogeneous networks 100–102 for independent monomedia connections not associated with a multimedia session. The multimedia call processor 210 and the monomedia call processor (not shown) must communicate or cooperate to share available resources for monomedia connections, regardless of whether they are associated with a multimedia session. In other words, the multimedia call processor 210 must take into account monomedia connections not associated with a multimedia session that are in progress, as would be apparent to a person of ordinary skill.

The multimedia call handler process 500, discussed below in conjunction with FIG. 5, will receive a connection request associated with a given monomedia or multimedia session during the call connection phase, analyze the types of media included in the session and network conditions and ensure that sufficient resources exist in the hybrid switching fabrics for each monomedia component in the multimedia session. If sufficient resources are available for the entire multimedia session, the multimedia call processor 210 will then request connections for each monomedia component from source to destination, in the same manner that a connection is requested in a conventional network for an integrated multimedia stream. As shown in FIG. 2 and discussed further below in conjunction with FIG. 4, the multimedia call processor 210 will ensure that sufficient resources exist in the hybrid switch for each monomedia component in the multimedia session, by accessing an overload control analysis database 400.

Figure 3:
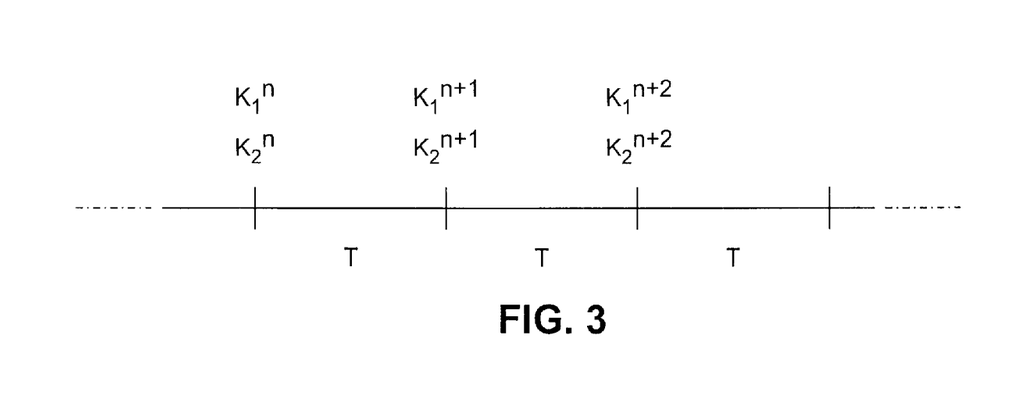
FIG. 3 illustrates the time intervals for which the number of calls, $K_i^n$, for each monomedia type, i, of a multimedia session are determined for an illustrative multimedia session consisting of two monomedia types (i=1, 2)

As shown in FIG. 3, the number of calls, $K_i^n$, of each monomedia type, i, which can be admitted into a network node 200 are determined for the n-th time interval, T. The size of the interval, T, can vary, depending on the system requirements, as would be apparent to a person of ordinary skill in the art. In one preferred implementation, the number of calls, $K_i^n$, of each monomedia type, i, admitted into a network node 200 for the n-th time interval, T, is based on the number of calls admitted over the previous interval, $N_1^{n-1}$.

As previously indicated, the multimedia call processor 210 will ensure that sufficient resources exist on the hybrid switching system for each monomedia component in the multimedia session, by accessing an illustrative overload control analysis database 400, shown in FIG. 4. In one embodiment, the overload control analysis database 400 contains eight rows, 405 through 445, each associated with a different case, or set of potential overload conditions. For each case number and corresponding set of overload conditions identified in fields 450 through 455, the overload control analysis database 400 records the number of calls of each monomedia type, i, that should be admitted by the call processor in the time interval, T. In the illustrative implementation, the number of calls, $K_i^n$, of each monomedia type, i, admitted into a network node 200 for the n-th time interval, T, is based on the number of calls admitted over the previous interval, $N_i^{n-1}$. In an alternate implementation, real-time calculations of the number of calls, $K_i^n$, of each monomedia type for each interval is performed and comparative evaluations shown in the overload control analysis database 400 leads to various overload states.

Case 1, for example, set forth in record 405 of the overload control analysis database 400 corresponds to a situation where the hybrid switching system has sufficient capacity, an overload condition is not present and corrective measures are not required. As a matter of fact, since the measured delay is below the predefined threshold, the present invention allows increasing the number of calls that can be admitted over future time intervals. There are many approaches for determining the amount of increase. In the overload control analysis database 400 (FIG. 4), the amount of increase corresponds to the ratio of the delay threshold and the measured delay. Thus, case 1 occurs when the average time delay for completion of call establishment of the overall multimedia session, and the connection of each individual monomedia component of the multimedia session, are all below a predefined threshold. As shown in record 405, the number of calls, $K_i^n$, of each monomedia type, i, admitted into a network node 200 over the n-th time interval, T, is equal to the number of calls of the corresponding monomedia type, i, multiplied by the ratio of the threshold interval within which the respective monomedia connections, i, should be established, $T_i^{max}$, over the measured average call completion time delay, $T_i^*$, for the monomedia component of type, i (the "excess capacity ratio"). If the threshold interval within which the respective monomedia connections, i, should be established, $T_i^{max}$, is greater than the measured average call completion time delay, $T_i^*$, for the monomedia component of type, i, then the number of accepted calls can presumably be increased. It is noted that if a denominator, $T_i^*$, is zero, then a non-zero value from past measurements is chosen. When the system is initializing and just starting to operate, it is allowed to operate for several intervals before measurements are performed.

Cases 2 and 3 set forth in records 410 and 415, respectively, of the overload control analysis database 400 correspond to a situation where the measured average call completion time delay, $T_i^*$, for one or more monomedia component of type, i, exceeds the threshold interval within which the respective monomedia connections, i, should be established, $T_i^{max}$. The interval for the overall multimedia session within which each of the individual monomedia connections should be established, $T_0^{max}$, however, is below the corresponding predefined threshold. Thus, for the monomedia types, i, which are below the corresponding predefined threshold, the number of calls, $K_i^n$, of such monomedia types, i, for the n-th time interval, T, is determined to be equal to the number of calls of the corresponding monomedia type, i, admitted over the previous interval (n−1) multiplied by the excess capacity ratio, in the same manner as case 1. For the monomedia types, i, which are above the corresponding predefined threshold, however, the number of calls, $K_i^n$, of such monomedia types, i, for the n-th time interval, T, is reduced to a value equal to the greater of the number of calls of the corresponding monomedia type, i, admitted over the previous time interval (n−1) multiplied by the excess capacity ratio, or the minimum number of calls that can be admitted, $N_1^{min}$.

Likewise, cases 4 and 5 set forth in records 420 and 425, respectively, of the overload control analysis database 400 correspond to a situation where the measured average call completion time delay, $T_i^*$, for one or more monomedia component of type, i, exceeds the threshold interval within which the respective monomedia connections, i, should be established, $T_i^{max}$, and the interval for the overall multimedia session within which each of the individual monomedia connections should be established, $T_0^{max}$, however, exceeds the corresponding predefined threshold. By reducing the number of calls, $K_i^n$, for the monomedia types, i, for which $T_i^*$ is above the corresponding predefined threshold, the interval for the overall multimedia session within which each of the individual monomedia connections should be established, $T_0$, is expected to be corrected.

Case 6 set forth in record 430 of the overload control analysis database 400 corresponds to a situation where the measured average call completion time delay, $T_i^*$, for each monomedia component type, i, exceeds the threshold interval within which the respective monomedia connections, i, should be established, $T_i^{max}$, but the interval for the overall multimedia session within which each of the individual monomedia connections should be established, $T_0^{max}$, however, is below the corresponding predefined threshold. Thus, the number of calls, $K_i^n$, of for each of the monomedia types, i, are reduced to a value equal to the greater of the number of calls of the corresponding monomedia type, i, multiplied by the excess capacity ratio, or the minimum number of calls, $N_i^{min}$.

Case 7 set forth in record 440 of the overload control analysis database 400 corresponds to a situation where the measured average call completion time delay, $T_i^*$, for each monomedia component type, i, and the interval for the overall multimedia session within which each of the individual monomedia connections should be established, $T_0^{max}$, all exceed the corresponding predefined threshold interval within which the respective connection should be established. In this case, the number of calls, $K_i^n$, for the monomedia types, i, are reduced in a calculation that considers the excess capacity ratios on the multimedia session ratio, as shown in record 440.

Finally, case 8 set forth in record 445 of the overload control analysis database 400 corresponds to a situation where the measured average call completion time delay, $T_i^*$, for each monomedia component of type, i, is below the threshold interval within which the respective monomedia connections, i, should be established, $T_i^{max}$, yet the interval for the measured overall multimedia session connection time, within which each of the individual monomedia connections are established, $T_0^*$, exceeds the corresponding predefined threshold. In this case, the number of calls, $K_i^n$, for each monomedia type, i, is reduced in a calculation that considers the excess capacity ration on the multimedia session ratio, as shown in record 445.

Figure 5:
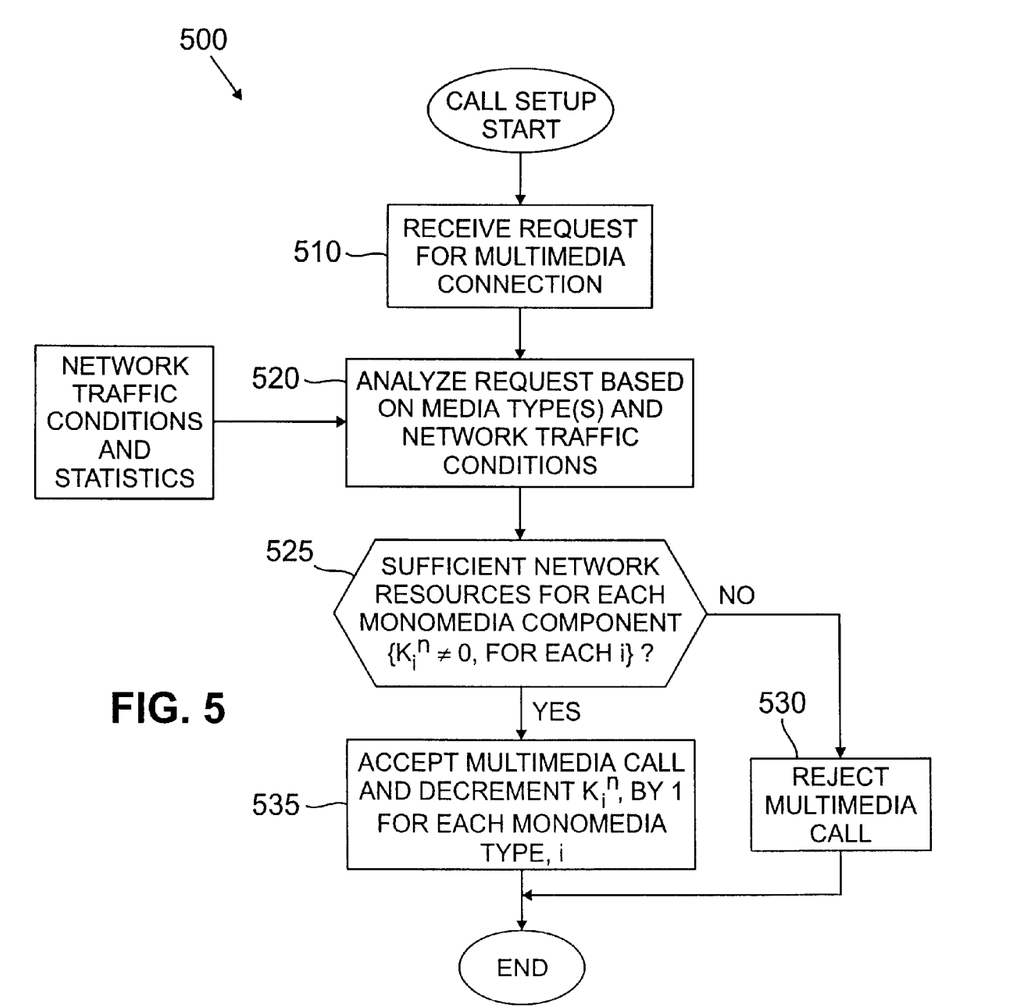
FIG. 5 is a flow chart describing an exemplary multimedia call handler process that may be utilized by the access node of FIG. 2.

As previously indicated, each node 200 includes a multimedia call handler processor 500, illustrated in FIG. 5, which will (i) receive a connection request associated with a given multimedia session during the call connection phase, (ii) analyze the types of media included in the session, and network conditions, and (iii) ensure that sufficient resources exist in the hybrid switching system for each monomedia component in the multimedia session. For a discussion of how connections are made from source to destination for each monomedia component, see U.S. patent application Ser. No. 08/936,386, filed Sep. 25, 1997 and entitled "Method and Apparatus for Transporting Multimedia Information Over Heterogeneous Wide Area Networks," incorporated by reference herein. As shown in FIG. 5, the multimedia call handler processor 500 will begin executing during step 510 upon receipt of a request for a multimedia connection.

Thereafter, the multimedia call handler processor 500 will analyze the request during step 520 based on media types and network traffic conditions. It is again noted that only one media type is involved for monomedia calls. A test is then performed during step 525 to determine if there are sufficient switch resources available to establish connections for each of the monomedia components within the multimedia session. In one embodiment, counters corresponding to the number of calls, $K_i^n$, for each monomedia type, i, during the time interval is decremented each time a corresponding monomedia connection is established. In this manner, it is guaranteed that sufficient switch resources are available to establish connections until one of the counters corresponding to the number of calls, $K_i^n$, equals zero.

If it is determined during step 525 that there are insufficient switch resources available to establish connections for each of the monomedia components within the multimedia session, the multimedia call is rejected during step 530, before program control terminates. In an alternate embodiment, depending on end user requirements, the end user may be queried to determine if the call should be accepted with less than all of the monomedia connections included.

If, however, it is determined during step 525 that there are sufficient switch resources available to establish connections for each of the monomedia components within the multimedia session, then the multimedia call is accepted during step 535 and the call counters for each monomedia type, $K_i^n$, as initially determined for the current time interval based on the cases in FIG. 7, are decremented by one.

It is to be understood that the embodiments and variations shown and described herein are merely illustrative of the principles of this invention and that various modifications may be implemented by those skilled in the art without departing from the scope and spirit of the invention.

We claim:

1. A method of preventing overload in one or more hybrid switches transporting a multimedia session containing multimedia information from a source to a destination, said multimedia information consisting of a plurality of monomedia components, said method comprising the steps of:
   determining if sufficient capacity is available in said one or more hybrid switches for each of said monomedia components before accepting said multimedia session;
   establishing a separate connection between said source and said destination for each of said monomedia components; and
   transmitting said monomedia components to said destination independently by means of said established connections.

2. The method according to claim 1, wherein said determining step is based on the measured time delay for completion of call establishment of one or more previous monomedia and multimedia sessions.

3. The method according to claim 1, wherein said step of determining if sufficient capacity is available comprises the step of determining if the measured time delay for completion of call establishment of one or more previous monomedia and multimedia sessions exceeds a predefined threshold.

4. The method according to claim 1, wherein said step of determining if sufficient capacity is available comprises the step of determining if the measured time delay for completion of call establishment of any individual monomedia components within one or more previous multimedia sessions, exceeds a predefined threshold.

5. The method according to claim 1, wherein said step of determining if sufficient capacity is available is performed at the beginning of each predefined time interval based on the measured average call completion time delay over some predefined period of time.

6. The method according to claim 1, wherein said step of determining if sufficient capacity is available determines a number of connections to accept during a predefined time interval for said monomedia sessio.

7. The method according to claim 6, further comprising the step of reducing one or more of said determined number of connections to accept for a subsequent time interval if the measured time delay for completion of call establishment of one or more previous multimedia sessions exceeds a predefined threshold.

8. The method according to claim 6, further comprising the step of reducing one or more of said determined number of connections to accept for a subsequent time interval if the measured time delay for completion of call establishment of any individual monomedia component within one or more previous multimedia sessions exceeds a predefined threshold.

9. The method according to claim 1, further comprising the step of rejecting said multimedia session if said step of determining if sufficient capacity is available determines that sufficient capacity is not available for one or more of said monomedia components.

10. A system for preventing overload in one or more hybrid switches transporting a multimedia session containing multimedia information from a source to a destination, said multimedia information consisting of a plurality of monomedia components, comprising:
    a multimedia traffic handler for:
        determining if sufficient capacity is available in said one or more hybrid switches for each of said monomedia components before accepting said multimedia session;
        establishing a separate connection between said source and said destination for each of said monomedia components; and
        at least one communications port for transmitting said monomedia components to said destination independently by means of said established connections.

11. The system according to claim 10, wherein said multimedia traffic handler determines if sufficient capacity is available based on the measured time delay for completion of call establishment of one or more previous monomedia and multimedia sessions.

12. The system according to claim 10, wherein said multimedia traffic handler determines if sufficient capacity is available by determining if the measured time delay for completion of call establishment of one or more previous monomedia and multimedia sessions exceeds a predefined threshold.

13. The system according to claim 10, wherein said multimedia traffic handler determines if sufficient capacity is available by determining if the measured time delay for completion of call establishment of any individual monomedia components within one or more previous multimedia sessions, exceeds a predefined threshold.

14. The system according to claim 10, wherein said multimedia traffic handler determines if sufficient capacity is available at the beginning of each predefined time interval based on the measured average call completion time delay over some predefined period of time.

15. The system according to claim 10, wherein said multimedia traffic handler determines a number of connections to accept during a predefined time interval for said monomedia sessio.

16. The system according to claim 15, wherein said multimedia traffic handler reduces one or more of said determined number of connections to accept for a subsequent time interval if the measured time delay for completion of call establishment of one or more previous multimedia sessions exceeds a predefined threshold.

17. The system according to claim 15, wherein said multimedia traffic handler reduces one or more of said determined number of connections to accept for a subsequent time interval if the measured time delay for completion of call establishment of any individual monomedia component within one or more previous multimedia sessions exceeds a predefined threshold.

18. The system according to claim 10, wherein said multimedia traffic handler rejects said multimedia session if said step of determining if sufficient capacity is available determines that sufficient capacity is not available for one or more of said monomedia components.

* * * * *